United States Patent [19]
Kondo et al.

[11] 4,448,059
[45] May 15, 1984

[54] ENGINE VIBRATION SENSOR

[75] Inventors: Haruyoshi Kondo; Masaharu Takeuchi, both of Aichi, Japan

[73] Assignee: Kabushiki Kaisha Toyota Chuo Kenkyusho, Aichi, Japan

[21] Appl. No.: 364,679

[22] Filed: Apr. 2, 1982

[30] Foreign Application Priority Data

Apr. 6, 1981 [JP] Japan ................................ 56-51326

[51] Int. Cl.³ .......................................... G01L 23/22
[52] U.S. Cl. ......................................... 73/35; 73/651; 324/80
[58] Field of Search .................. 73/35, 651, 654; 310/25; 324/80

[56] References Cited
U.S. PATENT DOCUMENTS 2,783,643  3/1957  Sihvonen .......................... 73/654
2,974,521  3/1961  Phelps ............................... 73/651
2,996,586  8/1961  Shindledecker et al. ......... 73/654

*Primary Examiner*—James J. Gill
*Attorney, Agent, or Firm*—Koda and Androlia

[57] ABSTRACT

An improvement in an engine vibration sensor of the type including a vibrator set to resonate at a specific frequency of vibration of the engine to which it is attached, for example the engine knocking vibration frequency, wherein the vibration of the vibrator is converted to an electric signal representing the specific engine vibration. The improvement consists of forming the vibrator from a magnetic material and providing a magnetic field generator for applying a magnetic field of controlled intensity to the vibrator, whereby the resonant frequency of the vibrator can be adjusted by varying the intensity of the magnetic field.

9 Claims, 24 Drawing Figures

ENGINE VIBRATION SENSOR

BACKGROUND OF THE INVENTION

1. Field of the Invention

This invention relates to an engine vibration sensor, more particularly to an engine vibration sensor which comprises a vibrator set to resonate at a predetermined, specific frequency of vibration of the engine to which it is attached, the vibration of the vibrator being converted into an electric signal representing the engine vibration.

2. Description of the Prior Art

Engines play an important role in ships, automobiles and many other devices and machines that contribute greatly to the quality of modern life. However, unless an engine is used under optimum operating conditions it is apt to suffer a decline in power output, abnormal vibration, abnormal wear and/or a decrease in fuel efficiency.

In order to assure that an engine is operating under optimum conditions, it is necessary to accurately monitor its actual operating state. One device known to be highly useful for this purpose is the engine vibration sensor. The usefulness of this device derives from the fact that the vibration of an engine at specific frequencies accurately reflects the operating state of the engine so that by measuring the magnitude and characteristics of the vibration at specific frequencies there can be obtained a considerable amount of data for use in optimizing the engine operating conditions. The specific frequency or frequencies selected for monitoring depend on the actual operating state of the engine. In the following, a specific example will be described in connection with the knocking vibration frequency of an engine.

Ordinarily, when ignition occurs too early in an engine, knocking and decreased power result. A decrease in power also occurs when the ignition is too late. It is therefore necessary to optimize the ignition advance so as to obtain maximum power and operating efficiency without causing the engine to knock. It is, however, no easy matter to determine the optimum value beforehand since it is dependent on the type of engine, the specific character of the engine, the number of revolutions and the intake pressure. Conventionally, the ignition advance has been set mechanically or electrically on the basis of the engine speed and the intake pressure. This method does not, however, always result in the optimum ignition advance. What has been done in actual practice, therefore, was to set the advance angle slightly smaller than the optimum value in order to prevent knocking, even though this meant that it was impossible to realize maximum power.

This expedient is no longer satisfactory since it runs counter to current demands for better engine fuel economy and fuel efficiency. The need for optimizing ignition advance is particularly strong in the case of the turbocharged engines that are being developed specifically for the purpose of reducing fuel consumption and boosting power. To meet the requirements of these engines there has been developed a knock control system for obtaining maximum efficiency wherein the ignition advance is automatically controlled using trace knocking as an index. For this system to operate effectively it is necessary to be able to measure the trace knocking of the engine quickly and accurately. Several types of engine vibration sensors have been developed and used for this purpose.

These known sensors include magnetostrictive, piezoelectric disk, piezoelectric cantilever and various other types, but none has been able to provide the required performance. For example, some are capable of precise measurement only within a limited temperature range while others can provide reliable results only at specific engine rotational speeds or under other specific measurement conditions. As a result, it has been difficult to carry out reliable engine knock control. Because of this, there has been desired a vibration sensor capable of reliably distinguishing between vibration peculiar to knocking and other miscellaneous types of vibration regardless of changes in the engine speed, temperature and other measurement conditions. Also, as most engines are of the multi-cylinder type, there has been desired a sensor capable of measuring the knocking vibration at a number of cylinders so as to make it possible to use a single sensor for optimizing the ignition advance for all cylinders of a multi-cylinder engine.

FIG. 1 shows engine vibration waveforms obtained by attaching a non-resonating vibrator having flat frequency characteristics to an engine and converting the engine vibration obtained through this vibrator to an electrical signal. The waveform shown in FIG. 1A is that obtained for an engine operating under a normal state of combustion without knocking while that shown in FIG. 1B is that obtained for an engine operating under an abnormal state of combustion with knocking. It will be noted from these graphs that in both cases the vibration wave periodically grows large in amplitude in synchronization with the combustion timing. In the case of FIG. 1B showing the waveform for an abnormal state of combustion, however, in addition to the periodic large amplitude waves there can be seen large amplitude vibration waves at positions somewhat shifted from the timing of the vibration peaks.

FIG. 2 shows the frequency spectra for the waveforms shown in FIGS. 1A and 1B. FIG. 2A shows the frequency spectrum for an engine operating under a normal state of combustion without knocking and FIG. 2B shows the frequency spectrum for an engine operating under an abnormal state of combustion with knocking. As is clear from these two graphs, the frequency spectrum in the case of normal combustion with no knocking is flat while that in the case of abnormal combustion with knocking is characterized by the occurrence of peaks at a specific frequency region.

Thus the vibration generated by knocking occurs within a frequency range extending from about 6 to 8 KHz while general vibration not related to knocking is spread over a wide range of frequencies. Because of this, by using a vibration sensor provided with a vibrator having resonant frequency characteristics which, as shown in FIG. 3, are coincident with the knocking vibration frequencies, it is possible to measure the engine's knocking vibration independently of its other general vibration.

In the case of the conventional vibration sensors used heretofore, however, it is often difficult to make the resonant frequency of the vibrator coincide with the knocking vibration frequency and under some measurement conditions the resonant frequency of the vibration sensor will be different from the knocking vibration frequency. When the two frequencies fail to coincide, the sensor becomes incapable of distinguishing between the general vibration arising from various parts of the engine and the vibration peculiar to knocking, meaning that the measurement characteristics of the sensor will be degraded.

The causes behind this degradation in measurement characteristics can be divided into those arising from the vibration sensor and those arising from the engine.

The first cause that can be mentioned in conjunction with the vibration sensor is poor quality, meaning poor quality of the sensor itself or of its state of attachment to the engine. More specifically, the resonant frequency of a vibration sensor is strongly affected by the material, dimensions and state of attachment of the sensor. Using current fabrication processes, it is not possible, no matter how much care is taken, to produce vibration sensors having any less scatter among their resonant frequencies than about 1 KHz. This means that many of the sensors will have resonant frequencies which are not in good coincidence with engine knocking vibration frequency and will thus have poor characteristics A second cause is that the resonant frequency of a vibration sensor varies with temperature. More specifically, the Young's modulus and the state of attachment of the vibrator of a vibration sensor changes with temperature and changes in these factors in turn cause changes in the resonant frequency. Since engines are commonly used over a wide range of temperatures extending from around −30 to around +120° C., vibration in resonant frequency because of temperature change is a major cause for degradation of the characteristics of a vibration sensor.

A third cause is the deterioration of vibration sensor characteristics that occurs with use. More specifically, even if the resonant frequency of a vibration sensor is adjusted to the knocking vibration frequency of the engine at the time it is attached to the engine, the state of attachment of its vibrator will deteriorate with use, with a resulting change in the resonant frequency. The consequent deviation between the resonant frequency and the engine knocking vibration frequency is another important cause of degradation of vibration sensor characteristics.

Next a look will be taken at factors on the side of the engine which can lead to a discrepancy arising between the resonant frequency of a vibration sensor and the knocking vibration frequency of the engine to which it is attached. First there are numerous operating conditions of the engine which cause variation in the engine's knocking vibration frequency such as the engine temperature, intake air pressure, and speed of rotation. The knocking vibration frequency will also vary from engine to engine even among engines of the same type. What is more, it will vary from cylinder to cylinder in one and the same engine. The resulting difference between the resonant frequency of the vibration sensor and the knocking vibration frequency of the engine to which it is attached constitutes still another major cause for degradation of the characteristics of the vibration sensor.

The conventional vibration sensor is further disadvantageous in that it is not capable of accurately measuring the knocking vibration at a plurality of cylinders each of which has a different knocking vibration frequency as is invariably the case in an actual engine. Therefore, in the conventional knock control system using trace knocking as an index, it has been the practice to set the angle of ignition advance for the cylinders not fitted with vibration sensors at a slightly smaller angle than the cylinder fitted with the vibration sensor. Consequently, knocking at the cylinders not fitted with vibration sensors can only indirectly be prevented by controlling the angle of ignition advance for the cylinder provided with the vibration sensor using the trace knocking thereof as an index. This means that in the knock control systems using conventional vibration sensors, the effect of the system could not be fully extended to all of the engine's cylinders.

SUMMARY OF THE INVENTION

The object of the present invention is to provide a vibration sensor which is free of the defects of the conventional vibration sensors mentioned above.

The more specific object of the present invention is to provide an engine vibration sensor capable of accurately measuring specific vibration frequencies of an engine, for example the knocking frequencies thereof, separately from other general vibrations of the engine, whereby it is made possible to control the engine to operate at optimum condition.

These objects of the invention are realized by providing an improved vibration sensor of the type including a vibrator set to resonate at a predetermined, specific frequency of vibration of the engine to which it is attached, wherein the vibration of the vibrator is converted to an electric signal representing the engine vibration, the improvement comprising forming the vibrator from a magnetic material and providing a magnetic field generator for applying a magnetic field of controlled intensity to the vibrator, whereby the resonant frequency of the vibrator is adjusted to the predetermined, specific frequency of vibration of the engine by varying the strength of the magnetic field.

DESCRIPTION OF THE PREFERRED EMBODIMENTS

The present invention will hereafter be described in further detail with reference to the accompanying drawings.

As was mentioned in the foregoing, the vibration of an engine at specific frequencies accurately reflects the operating state of the engine so that by measuring the magnitude and characteristics of the vibration at specific frequencies there can be obtained a considerable amount of data for use in optimizing the engine operating conditions. The engine vibration sensor according to the present invention measures these specific frequencies of an engine and uses the measured results for optimizing engine operation. In conjunction with the embodiments of the invention described hereinafter, it will be explained in particular how the vibration sensor according to this invention can be used for accurately measuring the vibration of an engine related to knocking separately from the general vibration of the engine and for controlling the angle of ignition advance to the optimum value.

Figure 1A:
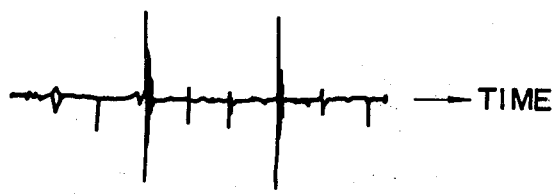
FIG. 1A is a diagram showing the vibration waveform for an engine operating in a normal combustion state as measured using a vibration sensor having flat frequency characteristics.
Figure 1B:
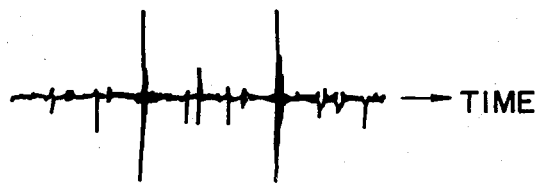
FIG. 1B is a diagram showing the vibration waveform for an engine operating in an abnormal combustion state as measured using a vibration sensor having flat frequency characteristics.
Figure 2A:
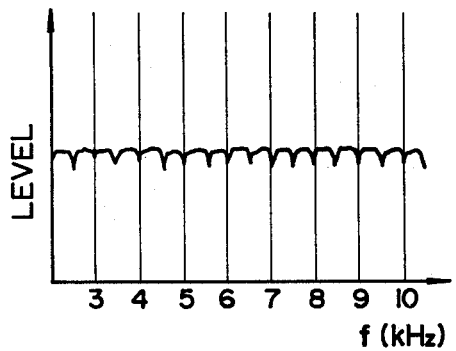
FIG. 2A is a graph showing the frequency spectrum of the vibration waveform shown in FIG. 1A.
Figure 2B:
FIG. 2B is a graph showing the spectrum of the vibration waveform shown in FIG. 1B.
Figure 3:
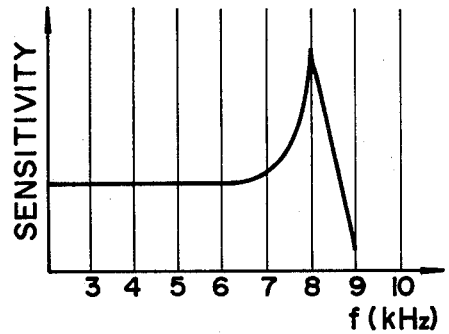
FIG. 3 is a graph showing the frequency characteristics of the vibrator of a resonating-type vibration sensor.
Figure 4A:
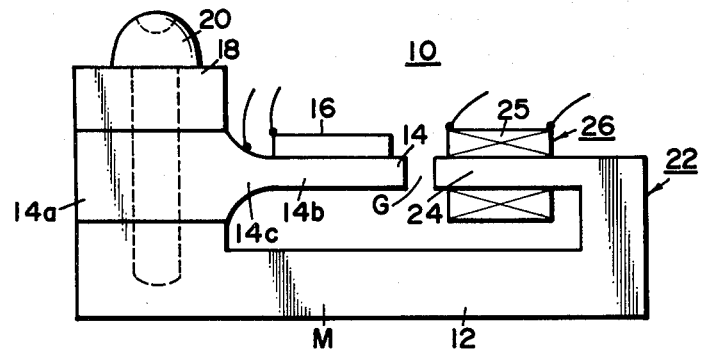
FIG. 4A is an explanatory view showing an embodiment of the vibration sensor according to the present invention.

One embodiment of the vibration sensor according to this invention is shown in FIG. 4A.

The vibration sensor, denoted by the numeral 10 in the drawing, has a base 12 integrally attached to the engine proper, a vibrator 14 which vibrates synchronously with the vibration of the engine, and a detector 16 for converting the mechanical vibration of the vibrator 14 into an electric signal. By setting the resonant frequency of the vibrator 14 to the knocking vibration frequency of the engine it becomes possible to electrically detect the state of knocking of the engine. The base 12 is securely fixed to the engine by a firm fastening means (not shown) and the root 14a of the vibrator 14 is clamped onto one end of the base 12 by a fastening member 18 and a screw 20 so as to retain the vibrator 14 in a cantilevered state. The root 14a of the vibrator 14 clamped onto the base 12 is formed thicker than the remainder of the vibrator and the intermediate region 14c between the root 14a and the vibrator element 14b is arcuately formed. By this construction, variation in the force acting to retain the vibrator 14 in attachment with the base 12 which might arise due to the cantilevered state of the vibrator 14 is suppressed and in this way possible change in the effective point of attachment and the effective length of the vibrator 14 as a result of a variation in the retaining force is prevented. The detector 16 is a piezoelectric element attached on the surface of the vibrator element 14b. When the vibrator 14 vibrates in resonance with the engine, the detector 16 converts this mechanical vibration into an electric signal.

The vibration sensor according to the present invention is characterized by the fact that the vibrator 14 is formed from a magnetic material having a large $\Delta E$ effect. By applying a magnetic field of appropriate strength to the vibrator 14 made of such material it is possible to adjust the resonant frequency of the vibrator 14 to the desired value. That is to say, the resonant frequency of the vibration sensor can be adjusted as desired so that when it differs from the proper value either because of factors attributable to the vibrator itself or because of external factors, or when a change has occurred in the specific frequency of the engine, the discrepancy between the resonant frequency and the specific frequency can easily be eliminated.

By $\Delta E$ effect is meant the property of a material whereby its Young's modulus changes with its degree of magnetization. Therefore, since the resonant frequency of an object is directly proportional to the square root of its Young's modulus (E), by forming the vibrator 14 of a material having a large $\Delta E$ effect it becomes possible by controlling the strength of a magnetic field applied to the vibrator to control the degree of magnetization of the vibrator and in this way to control its resonant frequency to a specific frequency of engine vibration. In this embodiment, this means that the resonant frequency of the vibrator 14 can be accurately adjusted to coincide with the knocking vibration frequency of the engine, whereby it becomes possible to detect and precisely measure the knocking vibration. Magnetic materials of this type usable in this invention include nickel, such nickel alloys as 68% permalloy (68Ni - Fe) and 45% permalloy, such iron-aluminum alloys as alfer (13Al - Fe), such ferromagnetic amorphous materials as $Fe_{78}$, $Si_{12}B_{10}$ and $Fe_{80}P_{13}C_7$, and ferrite.

Figure 5:
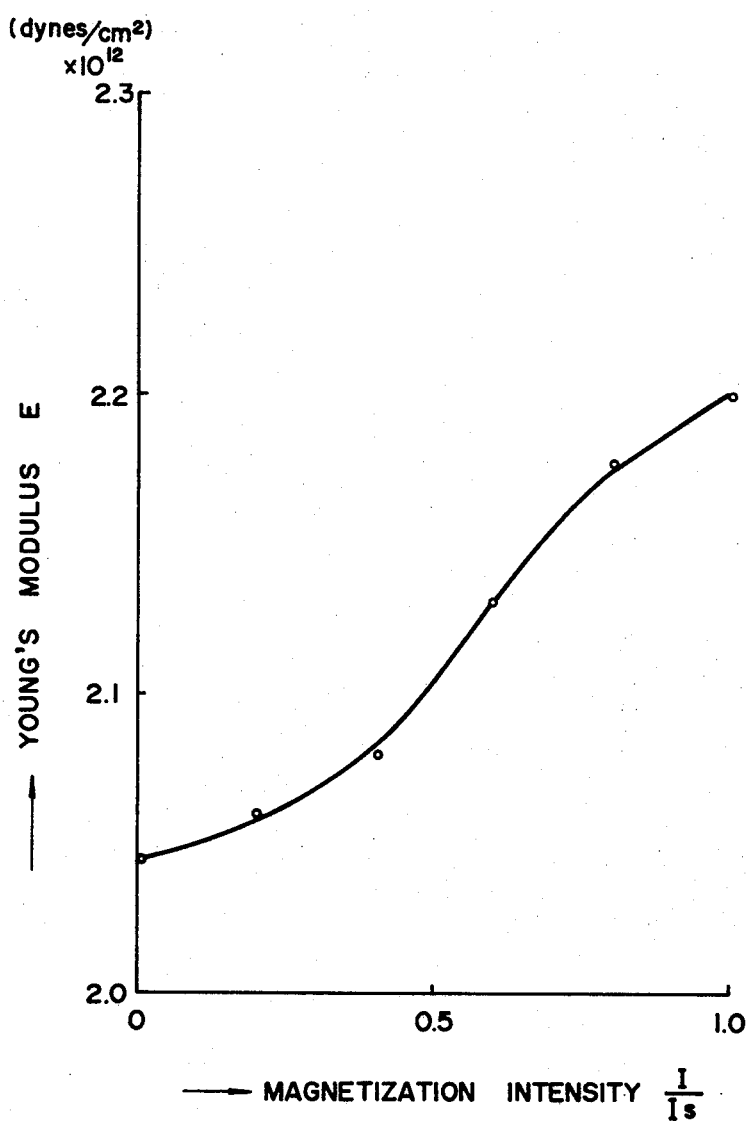
Figure 6:
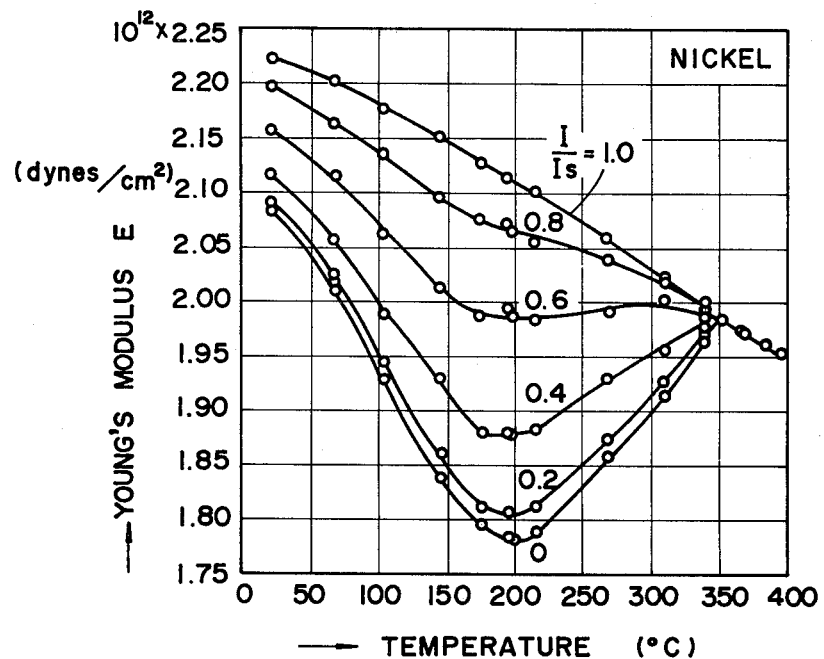
Figure 7:
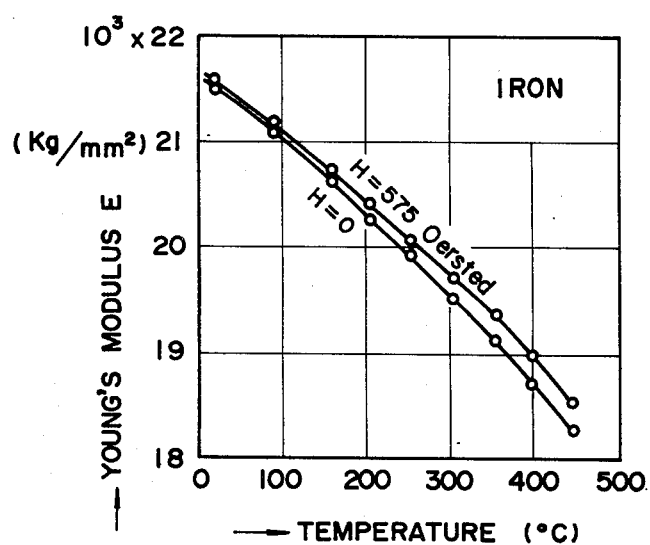

FIGS. 5 and 6 show the Young's modulus characteristics of nickel annealed at 800° C. FIG. 5 shows the relation between the magnetization intensity (I/Is) of the nickel and Young's modulus at 50° C. From this figure it will be noted that the Young's modulus of the nickel increases with increasing magnetization intensity. In this figure, the magnetization intensity I/Is is expressed as the magnetization intensity I under the application of a given magnetic field relative to the saturation magnetization intensity Is. FIG. 6 shows the relation between temperature and Young's modulus for the same nickel with the magnetization intensity taken as a parameter. Comparing the properties shown in FIG. 6 with those of pure iron shown in FIG. 7, it will be noted that, even though both nickel and iron are magnetic materials, the variation in Young's modulus E for nickel, which has a large $\Delta E$ effect, is much more pronounced than that for iron, which has a small $\Delta E$ effect.

Figure 8:
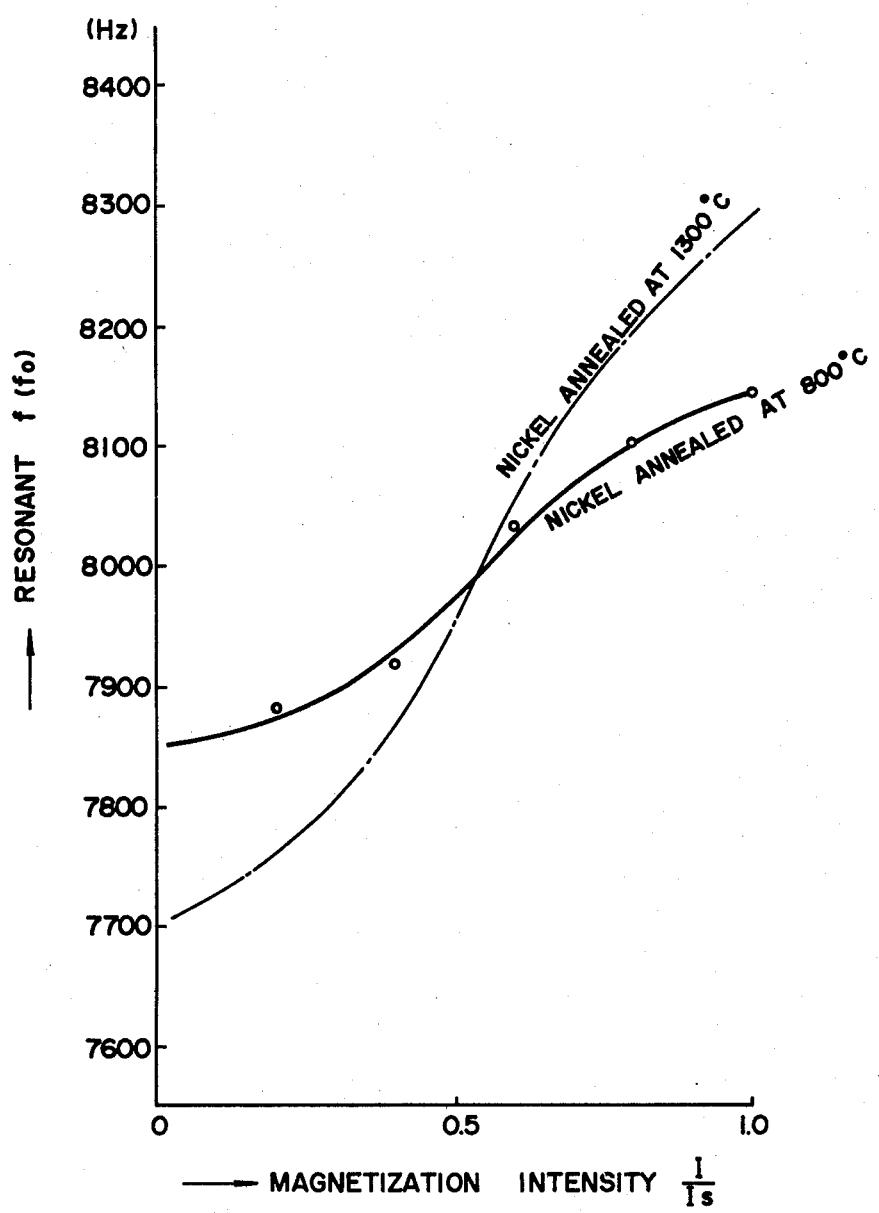

Moreover, the dependency of Young's modulus on magnetization intensity for nickel annealed at 1,300° C. is about twice that of nickel annealed at 800° C. Therefore, as shown in FIG. 8, the dependency of resonant frequency $f_o$ on magnetization intensity for nickel annealed at 1,300° C. is about twice that of nickel annealed at 800° C.

Figure 9:
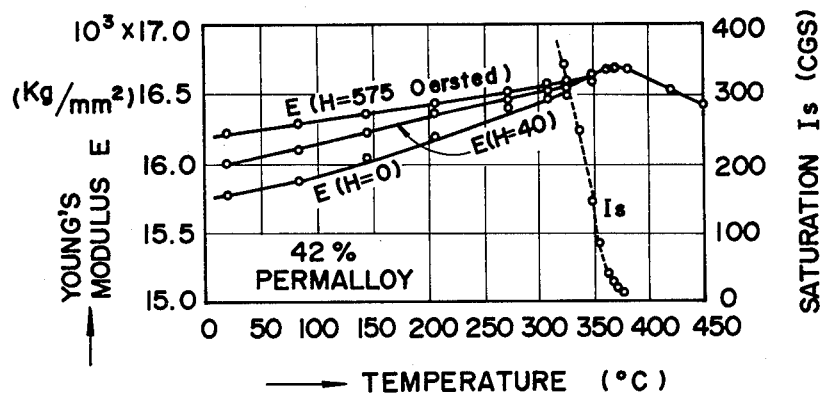

FIG. 9 shows the properties of another magnetic material having a large $\Delta E$ effect, 42% permalloy. It will be noted that in the case of 42% permalloy, the dependency of Young's modulus on magnetization intensity is somewhat less than that in the case of nickel shown in FIG. 6. However, whereas nickel has a negative temperature dependency, 42% permalloy has a positive temperature dependency.

In this invention, there is provided a magnetic field generator 22 (FIG. 4A) for applying a magnetic field of controlled intensity to the vibrator 14 formed of a magnetic material like those described above. In this embodiment, the magnetic field generator is provided on one end of the base 12. More specifically, the base 12 is formed with an L-shaped extension on the side opposite that to which the vibrator 14 is attached in such a way that the free end of this L-shaped extension comes into close proximity with the free end of the vibrator 14 across a gap G. The free end portion of the L-shaped extension is formed of an iron core member 24 which, together with a coil 25 wound thereon, forms an electromagnet 26. Therefore, by controlling the amount of magnetizing current passed through the coil 25, it is possible to control the magnetic field produced by the electromagnet 26 to a desired intensity. As in the illustrated embodiment, the iron core member 24, the gap G, the vibrator 14 and the base 12 constitute a magnetic circuit M, the magnetic flux due to the magnetic field is guided through the vibrator 14 formed of magnetic material, thereby making it possible to control the resonant frequency of the vibrator 14. In this embodiment it is preferable for the iron core member 24 to be formed integrally with the base 12 and for the base 12 to be formed of a soft magnetic material such as magnetic soft iron.

Now the operation of the engine vibration sensor of the construction described above will be explained.

The vibration sensor 10 in accordance with the present invention is constructed so that the resonant frequency of the vibrator 14 can be freely controlled within a certain range by controlling the amount of magnetizing current passing through the electromagnet 26 to thereby control the intensity of the magnetic field applied to the vibrator 14. Therefore, if the resonant frequency of the vibrator 14 is controlled to coincide with a specific frequency of engine vibration (in this embodiment, to the knocking vibration frequency), the vibrator 14 will then resonate with this specific frequency, making it possible to detect and measure the specific vibration of the engine distinct from the other general vibration of the engine.

Next, there will be described examples of how the vibration sensor according to the present invention can cope with various factors tending to cause the resonant frequency of the vibrator 14 to be out of coincidence with the specific frequency of engine vibration.

The first case to be considered will be that where the lack of coincidence is caused by the nature of the vibration sensor itself or by its state of attachment to the engine. This problem comes up when, in an operation involving the fabrication of a large number of sensors for attachment to a large number of engines, there occur differences in quality among the individual vibration sensors or in the conditions of their attachment to the engines. In such case, when the resonant frequency of a given vibration sensor is found not to coincide with the knocking vibration frequency of the engine to which it has been attached, the discrepancy can be eliminated by adjusting the intensity of the magnetic field applied to the vibrator 14 so as to cause the resonant frequency of the vibrator 14 to shift to a frequency corresponding to the knocking vibration frequency. Once this has been done, the vibration sensor will be capable of clearly distinguishing between engine knocking vibration and other general engine vibration. Therefore, in fabricating the vibration sensor 10 in accordance with this invention, there is no need to use strict quality control in connection with the materials from which the sensor is made or the dimensions of its components, nor is there any need to strictly control the operation of mounting the vibration sensor on the engine. As a consequence, the vibration sensor can be produced at much less cost and with many fewer fabrication steps than the conventional vibration sensors in use up to now.

The second case to be considered will be that where the lack of coincidence is caused by a temperature-induced change either in the resonant frequency of the vibrator 14 or in the knocking vibration frequency of the engine. In this case again, the discrepancy can be eliminated by adjusting the intensity of the magnetic field applied to the vibrator 14 so as to cause the two frequencies to come into coincidence. Thus, the engine knocking vibration can be detected and measured distinct from other general engine vibration, independently of any change in temperature.

FIGS. 10 to 14 are explanatory views of various embodiments of the vibration sensor 10 wherein the magnetizing current passed through the electromagnet 26 is automatically controlled on the basis of temperature.

Figure 10:
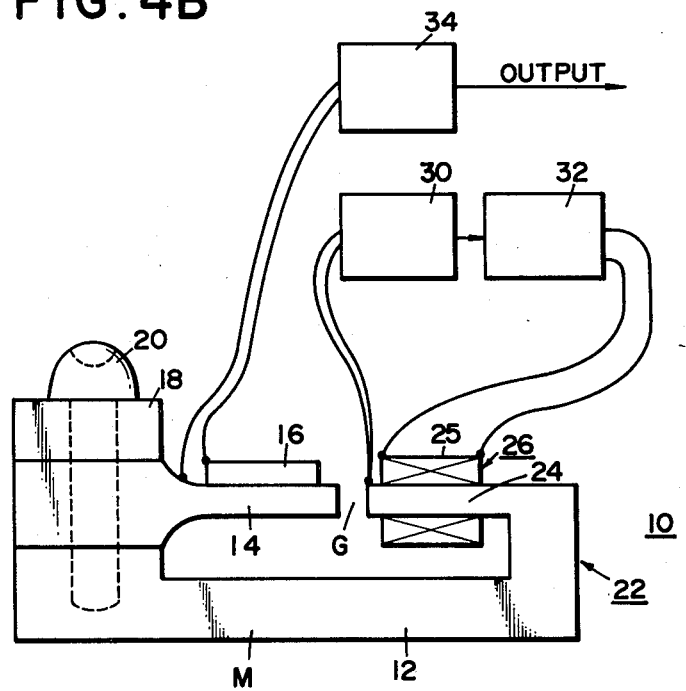
FIG. 10 is an explanatory view of a vibration sensor wherein the magnetizing current of an electromagnet is automatically controlled on the basis of detected changes in temperature.

The vibration sensor shown in FIG. 10 has a temperature detector 30 for detecting changes in the temperature of the iron core member 24 and a control circuit 32 which, on the basis of the temperature changes detected by the temperature detector 30, automatically controls the magnetizing current passing through the electromagnet 26. The signal corresponding to the engine vibration produced by the vibrator 14 is amplified by an amplifier 34 and forwarded to a processing circuit (not shown).

The manner in which the resonant frequency of the vibrator 14 of this vibration sensor 10 is controlled in response to changes in temperature will be described in the following.

Figure 12:
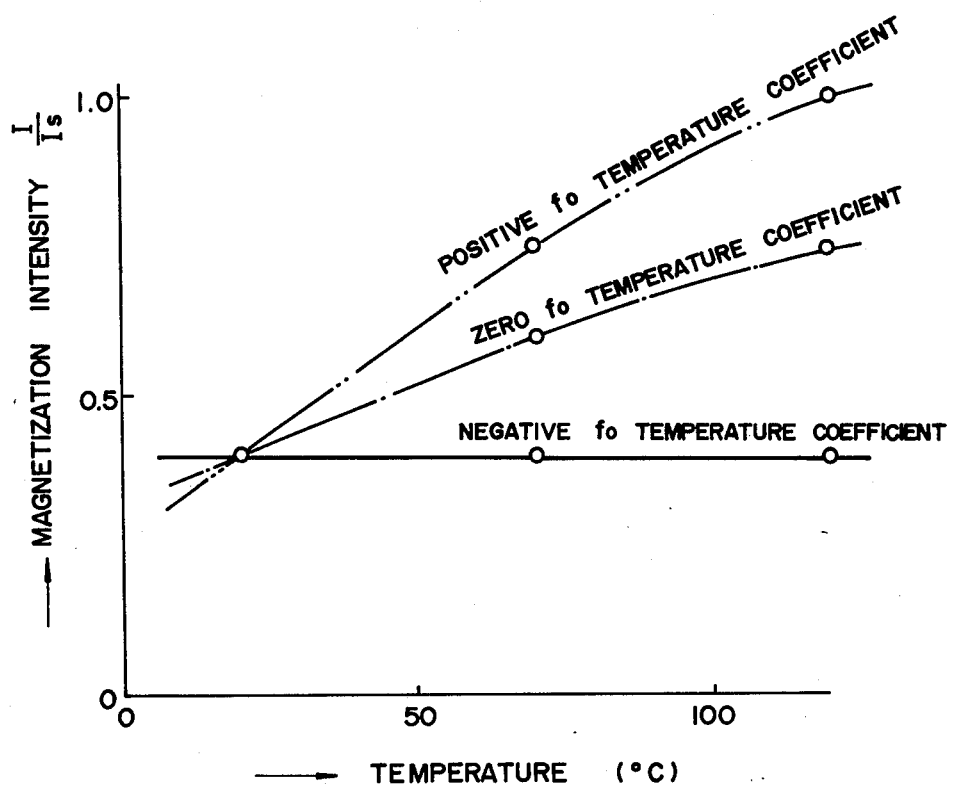
FIGS. 11 and 12 are graphs showing characteristics of nickel.
Figure 11:
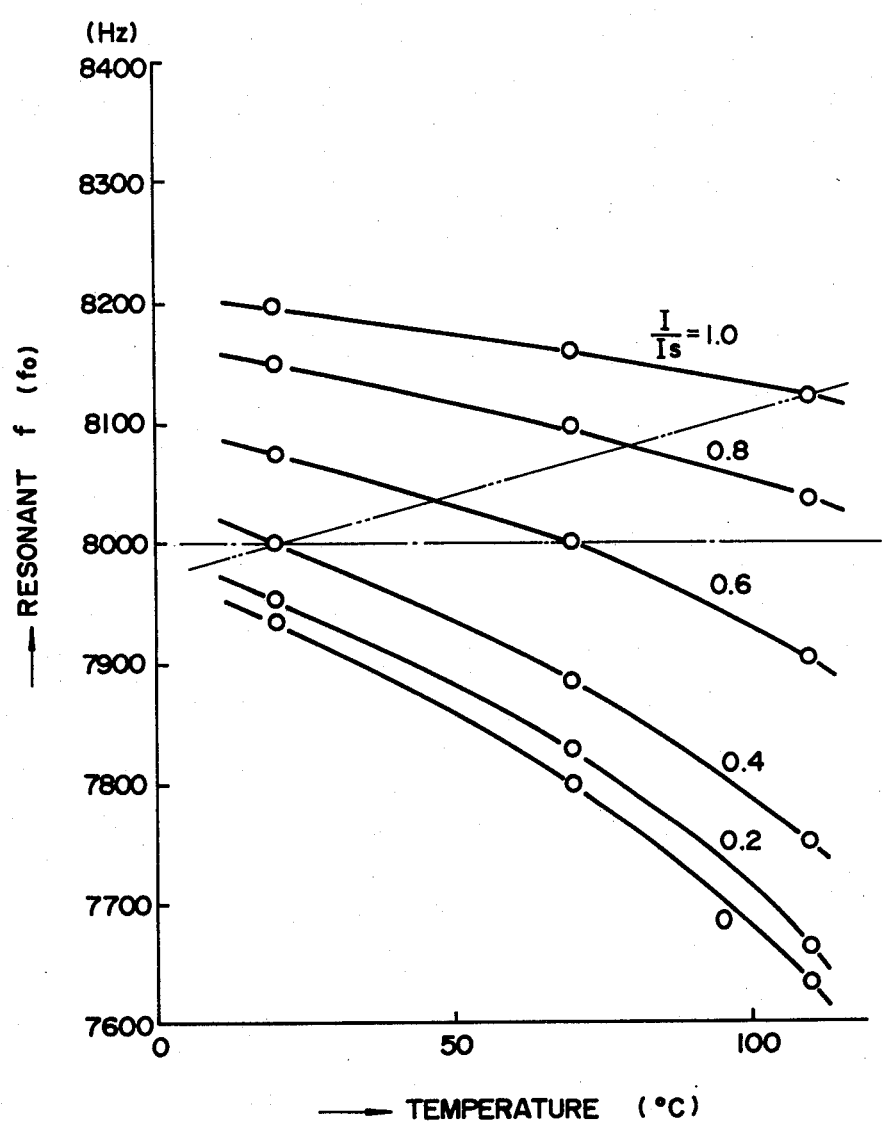

In the case of a vibrator 14 made of nickel and having the temperature characteristics shown in FIG. 6 (within the temperature range of 0 to 200° C.), the resonant frequency of the vibrator 14 will, for a given magnetization intensity, show a negative temperature dependency (a negative temperature coefficient). FIG. 11 shows the relation between the resonant frequency $f_o$ of a nickel vibrator 14 and temperature with the magnetization intensity $I/I_s$ taken as a parameter, while FIG. 12 shows the relation between temperature and magnetization intensity for a vibrator 14 having such properties in the cases where the temperature coefficient of the resonant frequency is taken as positive, zero and negative. The illustrated vibrator 14 made from nickel has a negative temperature coefficient so that under one and the same state of magnetization, its resonant frequency will decrease with increasing temperature. Therefore, if the engine knocking vibration frequency has the same temperature coefficient, it will be possible to obtain a change in resonant frequency matched to the change in engine knocking vibration frequency simply by maintaining the magnetic field at a constant intensity.

On the other hand, if the engine knocking vibration frequency does not change with temperature or if it has positive temperature characteristics, then as shown in FIGS. 11 and 12, it is possible to obtain temperature characteristics for the resonant frequency matched to the engine knocking vibration frequency characteristics by regulating the magnetic field intensity to change the magnetization intensity of the vibrator 14 in accordance with the change in temperature as shown by the one-dot chain line and the two-dot chain line. In the case of a negative temperature coefficient as well, if the resonant frequency of the vibrator 14 should not coincide with the engine knocking vibration frequency, it is also possible to regulate the intensity of the magnetic field in the same way to obtain the desired characteristics so as to obtain resonant frequency characteristics matched to the engine frequency characteristics over a desired range of temperature.

However, in the case of the vibration sensor 10 described in the foregoing, it is necessary for the control circuit 32 to control the magnetization current of the electromagnet 26 on the basis of the temperature continuously detected by the temperature detector 30.

Figure 13:
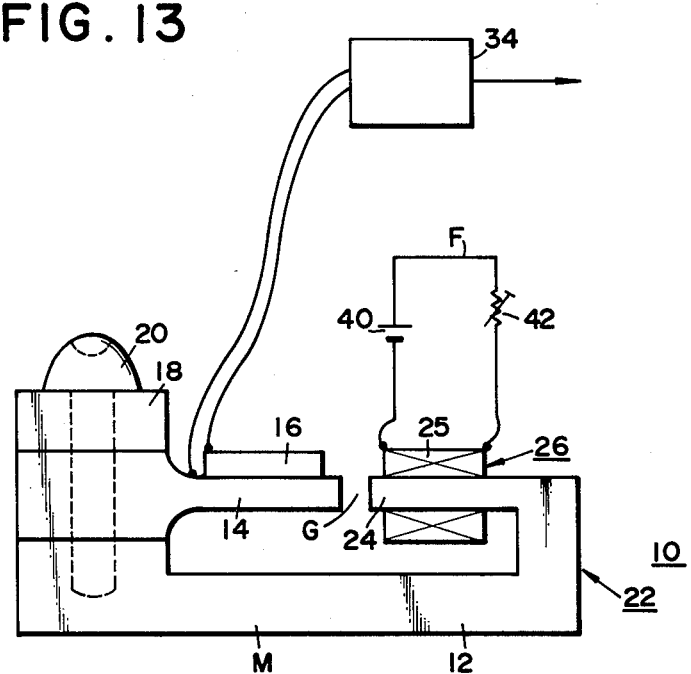
FIGS. 13 and 14 are explanatory views showing applications of the vibration sensor shown in FIG. 10.

In FIG. 13 on the other hand, there is illustrated a vibration sensor 10 designed to be capable of setting the temperature coefficient of the resonant frequency of the vibrator 14 at a desired specific value without need to measure temperature or control the magnetizing current on the basis of measured temperature, wherein advantage has been taken of the fact that the temperature coefficient of the resistance of the copper from which the coil 25 is made has a large positive value. More specifically, the coil 25 of the electromagnet 26 is provided with an exciting circuit F comprised of a DC power source 40 and a variable resistor 42 connected in series therewith. The magnetizing current passing through the circuit F is controlled by the change in resistance of the coil 25 with change in temperature. Thus, with this vibration sensor 10, the resistance of the coil 25 rises as the temperature thereof increases so as to limit the flow of magnetizing current and reduce the magnetic field generated by the electromagnet 26. As a result, the resonant frequency of the vibrator 14 is lowered, which is to say that the resonant frequency has a negative temperature coefficient. Moreover, this negative temperature coefficient can be set to a desired value within a certain range of negative values by adjusting the variable resistor 42. Therefore, in the case where the engine to which the vibrator 10 is attached manifests frequency characteristics having a negative temperature coefficient, the resonant frequency characteristics can be matched to the frequency characteristics of the engine within a predetermined temperature range by adjusting the temperature coefficient of the resonant frequency to the proper value.

Also, if there is used a construction wherein all or a part of the base 12 is formed of a permanent magnet and a part of the magnet field of the permanent magnet is canceled out by the electromagnet 26, then, since the magnetic field produced by the electromagnet 26 decreases with increasing temperature, the overall magnetic field of the magnetic circuit M will increase with increasing temperature so that it will be possible to adjust the temperature coefficient of the resonant frequency to a desired positive value.

Further, if desired, the coil 25 can be used simply as a temperature detector by superposing a minute AC current on the DC current of the exciting circuit F, using this AC component to measure the resistance of the coil 25 and then calculating the temperature from the measured resistance. The use of the coil 25 for the measurement of temperature is advantageous in that it eliminates the need for the provision of a separate temperature detector.

Figure 14:
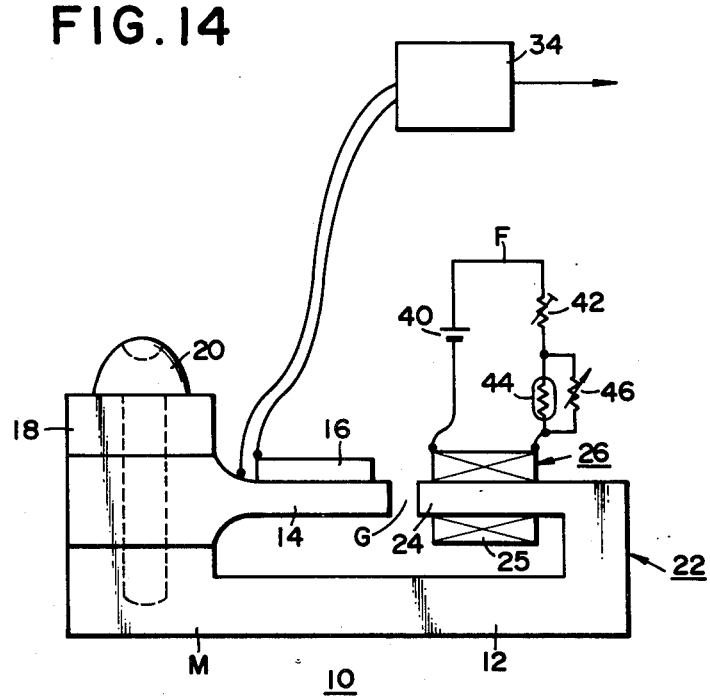

In the vibration sensor 10 illustrated in FIG. 13 it is possible to impart the resonant frequency of the vibrator 14 with either a positive or a negative temperature coefficient but it is not possible to adjust the temperature coefficient over a wide range including both positive and negative values. The vibration sensor 10 illustrated in FIG. 14 is improved in this respect. The improvement is obtained by series connecting into the exciting circuit F of FIG. 13 a thermosensitive resistor 44, which may for example be a thermister, and a variable resistor 46 connected in parallel with the thermosensitive resistor 44. With this construction, since the resistance of the coil 25 increases and that of the thermosensitive resistor 44 decreases with increasing temperature, it is possible by properly adjusting the variable resistors 42, 46 to adjust the temperature coefficient of the composite resistance of the exciting circuit F from positive to negative, whereby the temperature coefficient of the resonant frequency of the vibrator 14 can also be adjusted over a range including both positive and negative values. Therefore, regardless of whether the temperature dependence of the engine vibrating frequency is positive or negative, it is possible to set the temperature dependence of the resonant frequency of the vibrator to match that of the engine over the entirety of a desired temperature range.

The third case to be considered will be that where the engine knocking vibration frequency or the resonant frequency of the vibrator 14 has changed as a result of a deterioration in characteristics through use. In this case too, the problem can be overcome by adjusting the intensity of the magnetic field applied to the vibrator 14 so as to cause the resonant frequency of the vibrator 14 to shift to a frequency corresponding to the knocking vibration frequency. Once this has been done, the vibration sensor will be capable of clearly distinguishing between engine knocking vibration and other general engine vibration. Thus, if the two frequencies are checked either by periodic examination or automatically by an appropriate measuring means, it will be possible by using the vibration sensor in accordance with this invention to measure the knocking vibration of an engine distinct from other general vibration of the engine.

The fourth case to be considered will be that where the knocking vibration frequency varies with the engine speed. In this case, if the interrelation between the engine speed and the knocking vibration frequency is determined in advance, the problem can be overcome using the vibration sensor in accordance with this invention by regulating the magnetizing current passing through the electromagnet 26 at the time of a change in the engine speed so as to change the resonant frequency of the vibrator 14 to one that matches the knocking vibration frequency at the new speed of rotation. In this way it is possible to measure the knocking vibration distinct from other general vibration of the engine.

Figure 15:
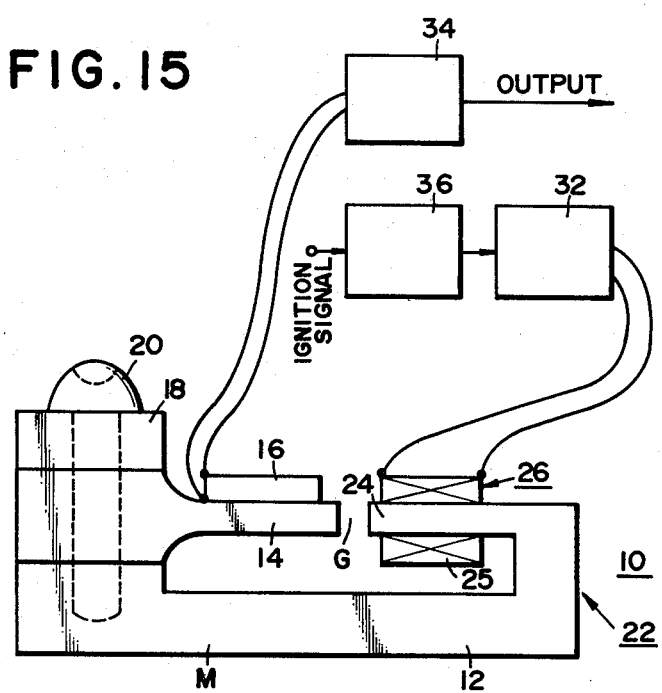
FIG. 15 is an explanatory view of a vibration sensor wherein the magnetizing current of an electromagnet is automatically controlled on the basis of the detected engine speed.

FIG. 15 is an explanatory view showing a vibration sensor 10 wherein this type of regulation of the magnetizing current is carried out automatically.

This vibration detector is provided with a rotational speed detector 36 and a control circuit 32 which controls the magnetization current on the basis of the rotational speed detected by the detector 36. The control circuit 32 is provided in advance with data representing the relationship between the engine speed and the knocking vibration frequency and is thus able to control the magnetizing current relative to the speed detected by the rotational speed detector 36 so as to maintain the resonant frequency in coincidence with the knocking vibration frequency at all speeds of the engine. As a result, the vibration sensor 10 of this embodiment is able to measure the knocking vibration of the engine distinct from other general vibration of the engine no matter what speed the engine is operating at.

The fifth case to be considered will be that where differing knocking vibration frequencies occurring at a number of cylinders are to be measured by a single vibration sensor 10. In an ordinary engine, the crank angles at the respective cylinders are offset from one another by equal intervals around one and the same axis of rotation, the part of the operating cycle at each cylinder during which knocking can occur is limited to within a short period of time starting from just after the piston has reached top dead center during the power stroke, and the knocking vibration frequency remains constant at any given cylinder. Therefore, if the timing of knock generation during the power stroke is determined for each cylinder from the crank angle and the magnetizing current of the electromagnet 26 is controlled to match the resonant frequency of the vibrator 14 to the knocking vibration frequency at the respective cylinders in accordance with the determined timing of knock generation, the vibration sensor 10 will be able to measure the knocking vibration at each cylinder distinct from other general vibration of the engine.

In, for example, a six-cylinder, four-stroke-cycle engine it is possible to detect knocking at each cylinder during a 120° portion of the cycle starting from the end of the compression stroke, that is, from the beginning of the power stroke at top dead center. Therefore, if the magnetization current of the electromagnet 26 is switched over every 120° of rotation of the crankshaft so as to adjust the resonant frequency of the vibrator 14 to the knocking frequency at the respective cylinders as they come into the knock generating part of their cycles, it will be possible to use a single vibration sensor for measuring knocking vibration distinct from other general vibration of the engine at all cylinders of the engine. Thus, when incorporated in the recently developed knock control system, the vibration sensor according to the present invention makes it possible for the system to manifest its effect to the full. Moreover, as a single sensor 10 according to this embodiment is able to produce the same effect as a number of conventional sensors attached one for each cylinder, it is also highly economical.

Figure 16:
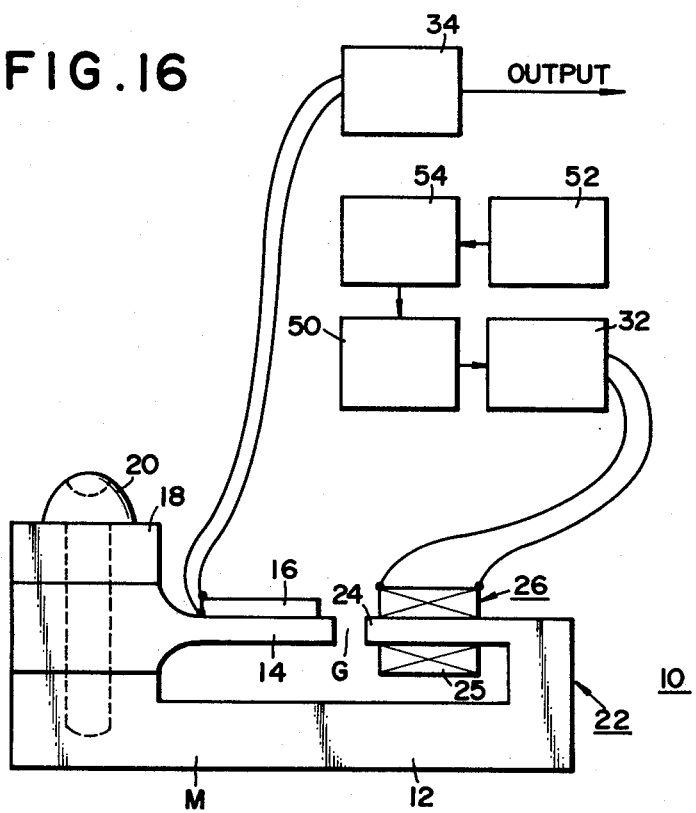
FIG. 16 is an explanatory view of a vibration sensor used to measure the knocking vibration at every cylinder of an engine.

FIG. 16 is an explanatory view of an embodiment of the vibration sensor 10 capable of automatically carrying out this type of detection of knocking vibration at each of a plurality of cylinders. This vibration sensor 10 is provided with a frequency memory device 50 having the knocking vibration frequency for each of the cylinders set therein, a crank angle detector 52 for sequentially detecting the angle of the crank at the respective cylinders, a crank angle dividing device 54 for determining the timing of knock generation at each of the cylinders on the basis of the detected crank angle and a control circuit 32 for controlling the magnetizing current passing through the electromagnet 26 in step with the knock generation timing determined for the respective cylinders by the crank angle dividing device 54 so as to coincide the resonant frequency with the knocking vibration frequency as determined from the data contained in the frequency memory device 50. By switching over the resonant frequency of the vibrator 14 in accordance with the crank angle, the knocking vibration at each cylinder can be detected distinct from the general vibration of the engine. In this arrangement, because of the inductance of the electromagnet 26, there will be a certain amount of time lag involved in changing the amount of magnetizing current at the time of switchover and it is therefore necessary to compensate for this lag by slightly advancing the switchover timing. The detection of the crank angle by the crank angle detector 52 can be easily carried out such as by using a signal derived from the engine ignition system or by deriving a signal from a part of the flywheel provided with a magnetically or optically sensible means.

Thus, as is clear from the foregoing, with the vibration sensor 10 according to the present invention, even if a discrepancy should arise between the resonant frequency of the vibrator 14 and a specific frequency of engine vibration such as the knocking vibration frequency because of any of various causes such as those mentioned in the five examples discussed above, the two frequencies can be brought into coincidence by regulating the resonant frequency so that the specific vibration can be measured distinct from other general vibration.

If necessary, two or more of the five examples described above may be used in combination.

Although in the foregoing embodiments there is used a piezoelectric type detector 16, the detector is not limited to such type and there may, in accordance with necessity, be used any of various other types such as a piezo-resistive element, a resistance wire, a strain gauge type device, an electromagnetic or electrostatic device, or an optical device.

Figure 4B:
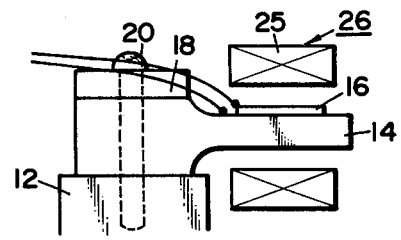
FIG. 4B is an explanatory view showing a modification of the vibration sensor of FIG. 4A, FIGS. 5 to 9 are graphs showing properties of various materials.

In the foregoing embodiments it is also possible to use as the magnetic field generating device 22 an arrangement such as that shown in FIG. 4B wherein the coil 25 is wound directly over the vibrator 14 to constitute the electromagnet 26 with the vibrator 14 as its core, the electromagnet 26 also constituting the magnetic field generating device. In this case it is possible to form the base 12 of a non-magnetic material.

In all of the foregoing embodiments there has been used a vibrator 14 whose resonant frequency changes with temperature. When a temperature-dependent vibrator of the type described hereinbefore is used, however, it is necessary to carry out an operation for compensating the resonant frequency for temperature-induced changes.

Now there will be described a vibration sensor which does not require compensation for temperature, i.e. a vibration sensor whose resonance frequency has a temperature coefficient of zero. Such a vibration sensor can be realized by integrally laminating with the vibrator a member having a Young's modulus temperature coefficient which is opposite in polarity to the Young's modulus temperature coefficient of the vibrator so that the Young's modulus temperature coefficients of the two members cancel out. For example, by forming the vibrator 14 of nickel or some other magnetic material having a negative Young's modulus temperature coefficient under a given state of magnetization and laminating this vibrator with a piezoelectric member or other member having a positive Young's modulus temperature coefficient under said given state of magnetization, there can be realized a member which, because of the mutual cancellation of the temperature coefficients of the two members, will have a resonant frequency which shows no dependence on temperature.

Figure 17:
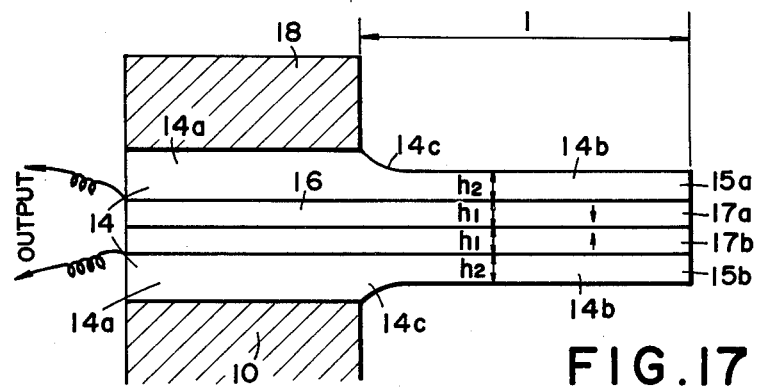
FIG. 17 is an explanatory view of a vibration sensor having a resonant frequency which is not dependent on temperature.

FIG. 17 is an explanatory view showing the important part of such a vibration sensor. The remaining parts of the vibration sensor are, for example, similar to those shown in FIG. 4A. In this embodiment of the vibration sensor 10, the vibrator 14 and the detector 16 are fabricated in an integrally laminated state. More specifically, the detector is formed by joining together two piezoelectric plates 17a, 17b oriented with their polarities opposite to each other and to either side of the so-formed detector 16 is joined a vibrator plate 15a or 15b of nickel or other magnetic material to thereby form the vibrator 14. For the piezoelectric plates 17a, 17b there can be used lead zirconium titanate (PZT) and as the vibrator plates 15a, 15b there can be used nickel annealed at 800° C. For the same reasons as mentioned in conjunction with the embodiment shown in FIG. 4A, the root 14a of the vibrator 14 is thicker than the other portions thereof and the intermediate region 14c between the root 14a and the vibrator element 14b is arcuately formed.

Next, the temperature dependence of the resonant frequency $f_o$ of the vibrator 14 of the vibration sensor of the construction described above will be considered. If the arcuately formed intermediate region 14c is ignored for the sake of simplifying the calculation, the vibrator 14 can then be considered to constitute a cantilever whose resonant frequency can be expressed as follows:

$$f_o = \frac{1}{2\pi}\left(\frac{1.8751}{l}\right)^2 \sqrt{\frac{b\{2E_1h_1^3 + E_2h_2(6h_1^2 + 6h_1h_2 + 2h_2^2)\}}{6b(\rho_1h_1 + \rho_2h_2)}} \quad (1)$$

wherein: $f_o$ is the resonant frequency; l is the length of the cantilever; b is the width of the cantilever; $E_1$ is the Young's modulus of the detector 16; $E_2$ is the Young's modulus of the vibrator 14; $h_1$ is the thickness of the detector 16; $h_2$ is the thickness of the vibrator 14; $\rho_1$ is the density of the detector 16; and $\rho_2$ is the density of the vibrator 14.

In this embodiment, the dimensions selected for the vibration sensor were $h_1=0.28$ mm, $h_2=0.1$ mm and $l=8.1$ mm and the resulting resonant frequency obtained was $f_o=8$ KHz. Since the quadratic coefficient for the cross-section of the vibrator 14 ($2h_2 \cdot l$) was about six times the quadratic coefficient for the cross-section of the detector 16 ($2h_1 \cdot l$), the resonant frequency $f_o$ represented by the formula (1) was under the dominating influence of the Young's modulus of the vibrator 14. Therefore, even when the vibrator 14 and the detector 16 are formed in a laminated construction as in this embodiment, it is still possible to adjust the resonant frequency $f_o$ to the desired value by controlling the intensity of the magnetic field.

It is also possible to obtain a vibration sensor 10 whose resonant frequency has a temperature coefficient of zero by using as the magnetic material for the vibrator 14 elinvar or some other material having a Young's modulus with an extremely low temperature dependence.

Although in the embodiments of the invention described above an electromagnet 26 was used as the magnetic field generator 22 for applying a magnetic field to the vibrator 14, the electromagnet 26 can be replaced by a permanent magnet without any adverse effect on the operation of the vibration sensor. Embodiments of the vibration sensor 10 wherein the magnetic field generator is constituted of a permanent magnet 28 are illustrated in FIGS. 18 to 21. In these embodiments, the intensity of the magnetic field applied to the vibrator 14 is adjusted by adjusting the gap G in the magnetic circuit M constituted of the vibrator 14, the base 12, the permanent magnet 28 and the gap G so as to vary the magnetic resistance of the magnetic circuit M.

Figure 18:
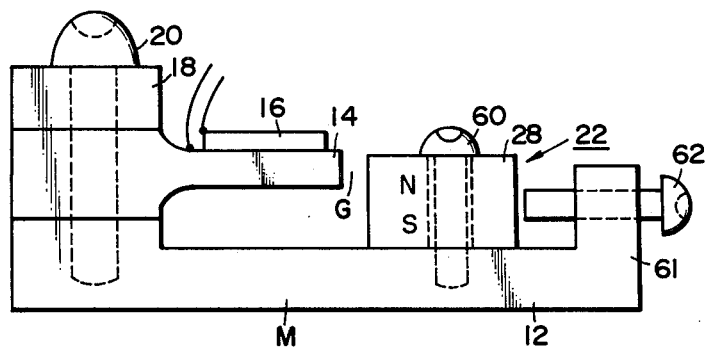
FIGS. 18 to 21 are explanatory views showing embodiments of the invention wherein magnetic field generators are constituted using permanent magnets.

In the vibration sensor 10 shown in FIG. 18, a permanent magnet 28 is fastened on one side of the base 12 by a screw 60. Although not shown in detail in the drawing, the hole in the permanent magnet 28 through which the screw 60 passes is formed to be longer than the diameter of the screw 60 in the lateral direction of the drawing so as to allow the permanent magnet to move left and right with respect to the base 12. On the end of the base 12 opposite to that supporting the vibrator 14 there is provided a wall 61 threadedly supporting an adjustment screw 62. The tip of the adjustment screw 62 contacts the face of the permanent magnet 28 on the opposite side from the gap G and determines the position of the permanent magnet 28 on the base 12. Therefore, the size of the gap G can be adjusted by turning the adjustment screw 62 to change the position of the permanent magnet.

Figure 19:
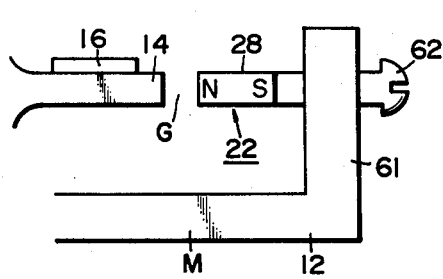

In the embodiment of the vibration sensor 10 shown in FIG. 19, the tip of an adjustment screw 62 formed of soft magnetic material has a permanent rod magnet 28 extending integrally therefrom. The tip of the permanent magnet 28 faces the vibrator 14 across a gap G which can be adjusted in size by turning the adjusting screw 62 to screw it inwardly or outwardly with respect to the wall 61.

Figure 20:
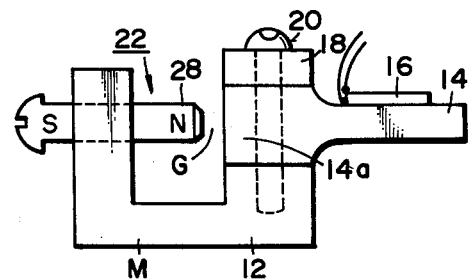

In the embodiment of the vibration sensor 10 shown in FIG. 20, the tip of the permanent magnet 28 is arranged to face the root 14a of the vibrator 14 across a gap G, in an arrangement that is nearly the same as that of the vibration sensor shown in FIG. 19.

Figure 21:
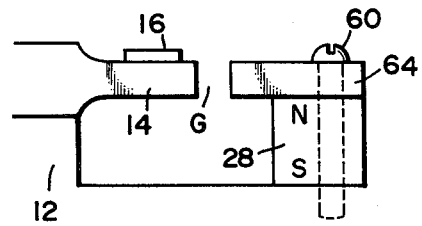

In the embodiment of the vibration sensor 10 shown in FIG. 21, instead of providing a permanent magnet positioned to face the vibrator 14, a permanent magnet 28 is provided on one side of the base 12 and is further provided thereon with a movable member 64 the tip of which faces the tip of the vibrator across a gap G. The size of the gap G is adjusted by adjusting the position of the movable member 64 with respect to the permanent magnet 28.

In each of the embodiments of the permanent magnet type vibration sensor shown in FIGS. 18 to 21, the strength of the magnetic field applied to the vibrator 14 can be controlled by regulating the size of the gap G, thereby adjusting the resonant frequency of the vibrator 14. Therefore, these embodiments of the vibration sensor are suitable for use in cases where the resonant frequency is to be adjusted at the time the vibration sensor is fitted on an engine or is to be adjusted later when the resonant frequency is found to have shifted because of the deterioration of the characteristics of the vibration sensor through use. As the permanent magnet 28 it is preferable, from the point of compactness and strong magnetic force, to use a rare-earth magnet such as one of SmCo$_5$, though it is also possible to use an alnico or ferrite magnet.

Although in the embodiments of the vibration sensor 10 shown in FIGS. 18 to 21 the magnetic resistance of the magnetic circuit M is adjusted by adjusting the size of the gap G, the invention is not limited to this arrangement and various other means may be used instead. For example, the magnetic resistance may be adjusted by adjusting the area of the surfaces facing each other across the gap G or, instead of adjusting the magnetic resistance, a number of permanent magnets may be provided and the overall intensity of the magnetic field be adjusted by increasing or decreasing the number of magnets.

Moreover, although in the embodiments of the vibration sensor 10 shown in the FIGS. 18 to 21 the size of the gap G is adjusted manually, the invention is not limited to this arrangement and various other means may be used instead. For example, in order to automatically set the magnetic resistance to the optimum value (and thus the resonant frequency to the optimum value) in response to temperature change, it is possible to adjust the size of the gap G or the area of the surfaces on opposite sides of the gap G by a thermosensing method such as by utilizing the expansion of a liquid such as a wax actuator or by utilizing a bimetal strip.

Although in all of the foregoing embodiments the vibrator 14 has been described as being of a cantilever structure, the invention is not limited to this arrangement and other constructions including a beam simply supported at both ends, a beam fixed at both ends or a beam fixed at one end and simply supported at the other may be used instead.

Although in all of the foregoing embodiments the gap G of the magnetic circuit M is described as being provided in the longitudinal direction of the vibrator 14, the invention is not limited to this arrangement and the gap G may instead be provided in the transverse direction of the vibrator 14 or in the vertical direction.

In the description of all of the foregoing embodiments, there was taken as an example a vibration sensor used for detecting and measuring the knocking vibration of an engine, wherein the resonant frequency of the vibrator of the vibration sensor is adjusted to coincide with the knocking vibration frequency of an engine by controlling the intensity of a magnetic field applied to the vibrator. Needless to say, however, the vibration sensor according to this invention is not limited to use for detecting and measuring the knocking vibration of an engine but can be used with equally good effect for the detection and measurement of various other types of vibration as well.

For example, the vibration sensor according to this invention can also be used for detecting and measuring the vibration associated with the seating of the intake or exhaust valves of an engine or the vibration occurring when a piston ring strikes against the internal surface of a cylinder.

In accordance with the present invention, the resonant frequency of a vibrator formed of a magnetic material can be adjusted to coincide with the frequency of a specific type of engine vibration such as knocking vibration by adjusting the intensity of a magnetic field applied to the vibrator. As a result, the present invention provides an engine vibration sensor capable of detecting and measuring specific types of vibration distinct from other general vibration, thus making it possible to optimize the operating conditions of the engine.

What is claimed is:

1. An engine vibration sensor comprising:
    a vibrator formed of a magnetic material whose Young's modulus varies in response to a strength of a magnetic field applied to said material, said vibrator having a resonant frequency to resonate at a specific frequency of vibration of an engine and the vibration of said vibrator being converted into an electric signal representing the engine vibration, said resonant frequency being variable in response to a change in magnetic field applied to said vibrator,
    a magnetic field generator for applying a magnetic field to said vibrator to vary the resonant frequency of said vibrator, and
    a means for controlling the intensity of the magnetic field applied to said vibrator by said magnetic field generator,
whereby the resonant frequency of the vibrator is adjusted to the specific frequency of vibration of the engine by varying the intensity of the magnetic field.

2. An engine vibration sensor as defined in claim 1, wherein said vibrator is formed of a material selected from the group consisting of nickel, an iron-nickel alloy, an iron-aluminum alloy, a ferromagnetic amorphous material and ferrite.

3. An engine vibration sensor as defined in claim 1, wherein said magnetic field generator is formed of an electromagnet and the intensity of the magnetic field to be applied to said vibrator is controlled by controlling the electric current passing through said electromagnet.

4. An engine vibration sensor as defined in claim 1, wherein said magnetic field generator is formed of a permanent magnet and the intensity of the magnetic field to be applied to said vibrator is controlled by controlling the magnetic resistance of a magnetic circuit.

5. An engine vibration sensor as defined in any of claims 1 to 4, further comprising a means to sense engine temperature and wherein said controlling means controls the intensity of the magnetic field to be applied to said vibrator in response to the sensed temperature of the engine.

6. An engine vibration sensor as defined in any of claims 1 to 4, further comprising a means for sensing engine speed and wherein said control means controls the intensity of the magnetic field to be applied to said vibrator in response to the sensed engine speed.

7. An engine vibration sensor as defined in any of claims 1 to 4, further comprising a means for sensing engine temperature and speed and wherein said control means controls the intensity of the magnetic field applied to the vibrator in response to the sensed temperature of the engine and the sensed engine speed.

8. An engine vibration sensor as defined in any of claims 1 to 4, wherein the specific frequency of vibration of the engine to which the resonant frequency of said vibrator is adjusted is the knocking vibration frequency of the engine.

9. An engine vibration sensor as defined in claim 8, wherein said control means controls the intensity of the magnetic field to be applied to said vibrator in accordance with the timing of the occurrence of knocking at the respective cylinders of the engine.

* * * * *